March 17, 1959  J. J. BIEGER ET AL  2,877,648
GEAR TRAIN TESTING APPARATUS
Filed March 14, 1957  2 Sheets-Sheet 1

INVENTORS
JOCOB J. BIEGER
RAYMOND H. WADSWORTH
BY
ATTORNEYS

March 17, 1959   J. J. BIEGER ET AL   2,877,648
GEAR TRAIN TESTING APPARATUS
Filed March 14, 1957   2 Sheets-Sheet 2
FIG. 3
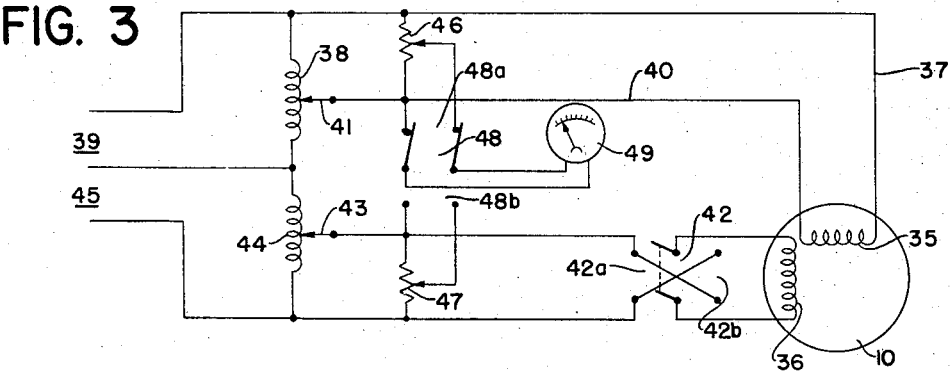
FIG. 4
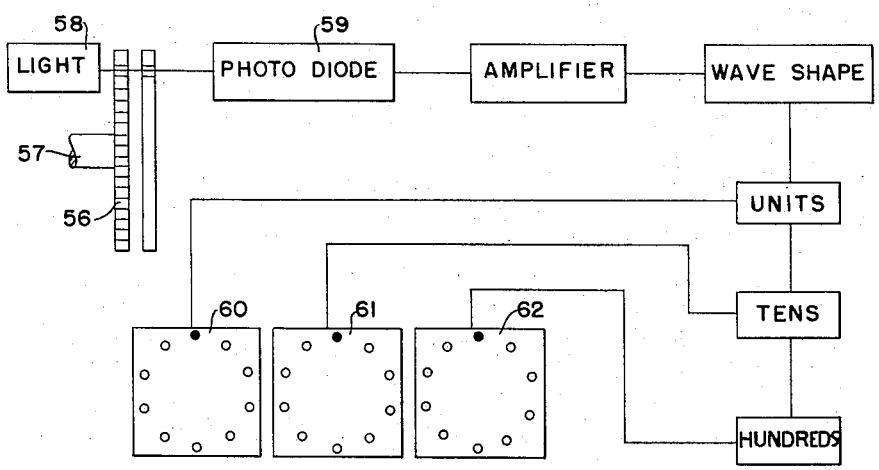
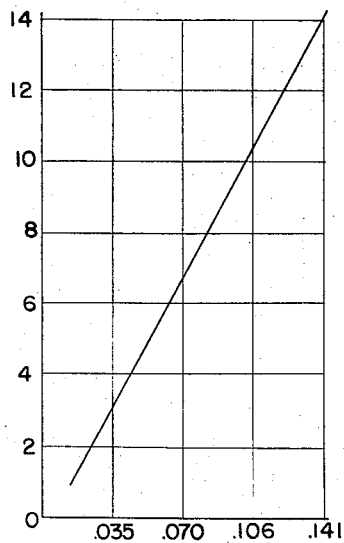
FIG. 5
INVENTORS
JOCOB J. BIEGER
RAYMOND H. WADSWORTH
BY
Pennie, Edmonds, Morton, Barrows & Taylor
ATTORNEYS United States Patent Office 2,877,648
Patented Mar. 17, 1959

2,877,648

GEAR TRAIN TESTING APPARATUS

Jacob J. Bieger, Queens Village, N. Y., and Raymond H. Wadsworth, South Orange, N. J., assignors to Daco Machine & Tool Co., Brooklyn, N. Y., a partnership Application March 14, 1957, Serial No. 646,089

6 Claims. (Cl. 73—162)

This invention relates to an apparatus for testing precision instrument gear trains comprised of relatively small fine pitch gears, and more particularly to an electromechanical apparatus for indicating the small inaccuracies in instrument gear trains, in terms of angular shaft displacement for predetermined torque inputs under locked train conditions.

In connection with the manufacture and assembly of small, high-ratio precision gear trains, for use in precision instruments, for example, it is usually necessary to test the assembled gear train for such inaccuracies as may be introduced therein by backlash between gears, deflections, etc. However, as a practical matter, it is difficult, if not impossible, for most manufacturers to test precision gear trains functionally, under actual operating conditions. Accordingly, specifications for precision gear trains now often require, as a substitute for actual functional testing, that precision gear trains be tested for angular displacement of the gear train input under locked train conditions, i. e., with the gear train output locked against rotation.

When accurately measured, the total angular displacement of a gear train input, with the train output locked, will reflect the resultant of the various inaccuracies in the gear train, including backlash due to variation in gear tooth thickness, gear eccentricity and center-to-center distance variations, eccentricity in shaft assemblies and bearings, radial play in bearings, transverse and torsional deflections in shafts, and the quality of the assembly techniques employed. However, in the case of small precision gear trains having high reduction ratios, it has been difficult, if not impossible, heretofore, to measure accurately the angular displacement of the gear train input under locked train conditions.

Conventional laboratory testing techniques for determining the angular displacement of a gear train input involve the application of a torque, by means of a known moment arm and standard weights, and reading the angular displacement with a dial and pointer, or the use of commercially available torque wrenches and torque meters. Both methods have proved unsatisfactory for the testing of small precision gear trains. The first method requires considerable time and skill, and is fundamentally not adaptable to the testing of gear trains in production quantities. Moreover, the manual application of the minute input torques required in the testing of high-ratio precision gear trains is extremely difficult. The second method is limited to torque application only, and is not suitable for determining the angular displacement of a gear train input.

One of the important features of this invention resides in the provision of a novel and improved apparatus for bench testing high-ratio gear trains by applying an accurately measured predetermined torque under locked train conditions and measuring the angular displacement of the shaft to which such accurately measured torque is applied. More specifically, the invention provides for the application of an input torque to a locked precision gear train by means of a motor having a balanced rotor and of a type adapted continuously to provide a torque of predetermined magnitude upon the application thereto of energizing forces. With the new apparatus input torque may be applied to a precision gear train with extreme accuracy, even when the desired torque input is in the order of a small fraction of an inch-ounce.

In accordance with the invention, the testing of high-ratio precision gear trains may be carried rapidly and efficiently under production conditions, with highly accurate test results being obtainable by relatively unskilled personnel.

One of the desirable advantageous features of the invention is that the testing of a precision gear train may take place with the gear train in an environmental test chamber, subject to various conditions of moisture and temperature, etc., while the test operator is outside the chamber and, if desired, located remotely thereof.

The new apparatus is useful not only in the testing of assembled precision gear trains for inaccuracies, but may also be used to great advantage in testing gear trains to determine break-away torque, i. e., the torque required to put the gear train in motion, and for properly adjusting friction clutches, which are often used as safety devices in small precision gear trains.

For a better understanding of the invention, reference should be made to the following detailed specification and accompanying drawings, in which:

Fig. 3 is a simplified schematic representation of an electrical circuit used in connection with the apparatus of Fig. 1;

Fig. 4 is a simplified schematic representation of a modified form of apparatus for use in indicating shaft deflection and rotation during the testing of a precision gear train; and Fig. 5 is a graph of input voltage versus torque which may be employed in connection with the use of the apparatus.

Figure 1:
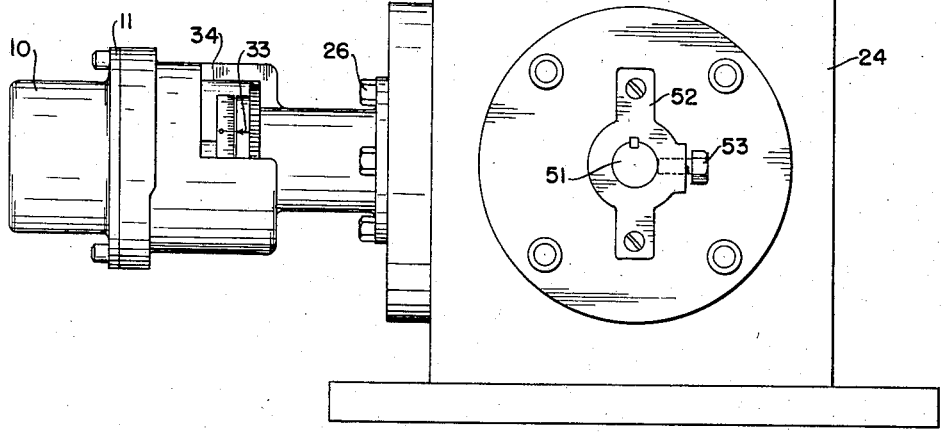
Fig. 1 is a side elevation of the new gear train testing apparatus in operative position for testing a precision gear train.
Figure 2:
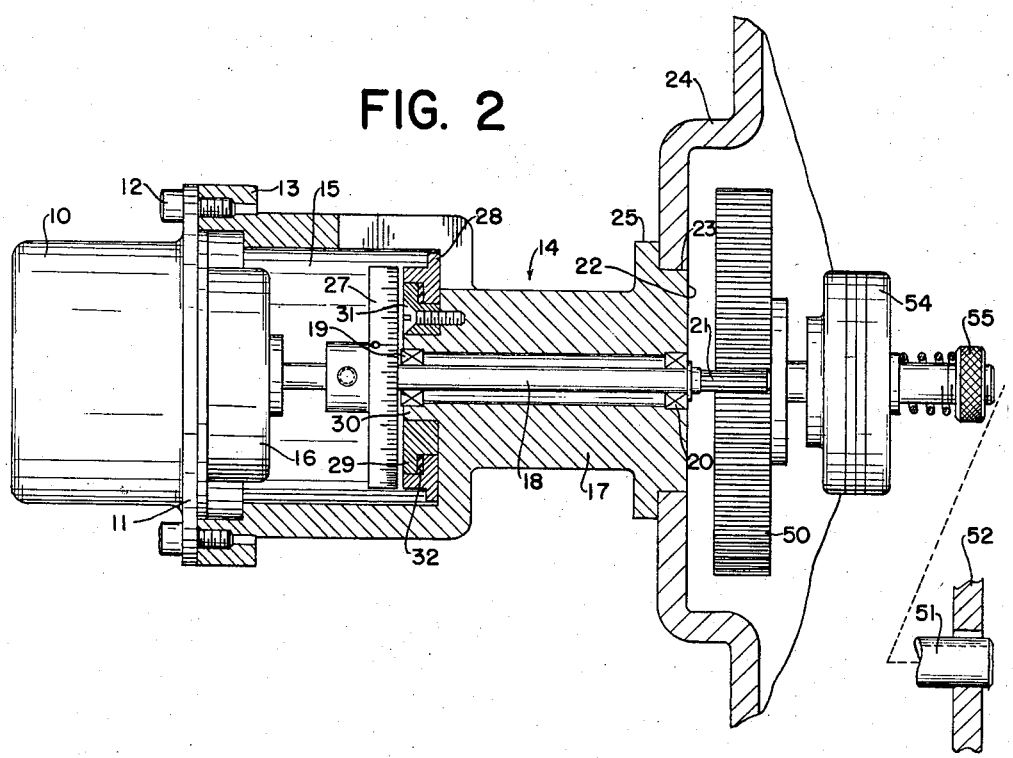
Fig. 2 is an enlarged fragmentary view, partly in section, showing details of construction of the apparatus of Fig. 1.

Referring now to the drawings and initially to Figs. 1 and 2 thereof, the numeral 10 designates a small electric motor which, in the preferred form of the invention, is a drag cup torque motor. The illustrated motor 10 has a flange 11 near its forward end, which is attached, by means of bolts 12, to the outer flange 13 of a tubular adaptor member, generally designated by the numeral 14.

The adaptor 14 has an enlarged chamber 15 adjacent its outer end, which receives the forward end 16 of motor 10, and has a tubular neck portion 17 through which a shaft extension 18 of the motor projects. Suitable anti-friction bearings 19, 20 are provided at the opposite ends of the tubular neck 17 to support the shaft extension 18 in a rigid manner for friction-free rotation. The forward end of the shaft extension 18 projects beyond the forward end of the adaptor 14 and, in the illustrated form of the apparatus, carries a small-diameter pinion 21.

At its forward end the adaptor 14 has a machined boss 22 adapted to be received in an opening 23 formed in the housing 24 of a gear train to be tested. A flange 25 extends radially from the boss 22 and seats against the outer wall of the housing 24 to position the adaptor accurately with respect to the housing. Suitable bolts 26 may be employed to secure the flange 25 to the gear train housing 24.

Mounted on the motor shaft extension 18, within the outer chamber 15 of the adaptor, is a disc 27 having a plurality of graduations about its periphery. Advantageously, the disc may be provided with 360 graduations, each spaced one degree apart.

In accordance with the invention, the drag cup motor 10 has an accurately balanced rotor, and the assembly comprising the shaft extension 18 and disc 27 are likewise accurately balanced, so that the rotating parts are stable in any rotary position.

Seated against the inner wall of the adaptor chamber 15 is an indicator ring 28. The indicator ring is held in place by a locking ring 29 received over a cylindrical hub 30 and secured to the neck 17 by suitable screws 31. The indicator and locking rings 28, 29 have overlapping surfaces, between which is interposed a washer 32 of friction material. Advantageously, the arrangement is such that the indicator ring 28 is normally held in fixed position by the locking ring 29 and friction washer 32, while at desired times the indicator ring may be rotated by overcoming the frictional forces imposed thereon. As shown in Fig. 1, the indicator ring 28 has inscribed thereon a reference pointer 33 which appears adjacent the graduations of the disc 27. Also, as shown in Fig. 1, a portion of the adaptor 14 is removed, as at 34, to expose the graduated disc 27 and indicator ring 28 within the chamber 15.

One of the advantageous characteristics of a drag cup torque motor, such as the motor 10 incorporated in the apparatus of Figs. 1 and 2, is the ability of the motor to deliver a constant torque when stalled, without vibration or overheating. It is also an advantageous characteristic of a motor of this type that the torque output thereof varies linearly with the applied voltage. Accordingly, by using a conversion graph of the type shown in Fig. 5, accurately predetermined torque outputs may be obtained by applying energizing voltages of known magnitude to the motor. Moreover, an accurately predetermined torque may be applied in either direction by reversing the polarity of the energizing voltage without altering the magnitude thereof.

Referring now to Fig. 3, the motor 10, indicated schematically, has a pair of windings 35, 36. One terminal of the winding 35 is connected, by means of a conductor 37, to one side of an auto-transformer 38, which is energized from a regulated source 39 of alternating current voltage. The other terminal of the winding 35 is connected, by means of conductor 40, to the movable tap 41 of the auto-transformer 38. Accordingly, the voltage applied to the winding 35 may be varied by appropriate adjustment of the movable tap 41.

Motor coil 36, which may be considered the control coil, has its opposite terminals connected to a double-pole double-throw switch 42 having sets of contacts 42a, 42b. The contacts 42a, 42b are cross-connected to one terminal and the movable tap 43 of an auto-transformer 44, energized by regulated source 45 of alternating current voltage. Accordingly, the voltage applied to the switch contacts 42a, 42b may be varied by adjustment of the movable tap 43, and the voltage thus available at the switch contacts may be applied alternatively with opposite polarity to the control coil 36 of the motor 10.

In order to regulate the respective coil voltages in the manner desired, the secondary circuits of the respective auto-transformers 38, 43 are provided with shunt potentiometers 46, 47 connected to contacts 48a, 48b, respectively, of a double-pole double-throw switch 48. Also connected to the switch 48 is a suitable voltmeter 49, the arrangement being such that, when either set of contacts of the switch 48 are closed, the voltmeter 49 will indicate the voltage at the output of one or the other of the potentiometers 46, 47. The calibration of the voltmeter 49 and the adjustment of the potentiometers 46, 47 is such that the voltages registered by the voltmeter are indicative of the voltages supplied to the respective motor coils 35, 36.

In using the new apparatus to test a precision gear train, the adaptor 14 is bolted to the gear train housing 24, substantially as shown in Fig. 1, so that the pinion 21 at the outer end of the shaft extension 18 meshes with the input gear 50 of the gear train. The output shaft 51 of the gear train is locked against rotation by any suitable means, such as bracket 52 secured to the housing 24 and provided with means such as bolt 53 for gripping the output shaft 51. When the motor assembly is properly affixed to the housing 24, the coils 35, 36 of the motor 10 are energized at a voltage level selected to produce a desired torque output. This is accomplished by manipulating the adjustable taps 41, 43 of the auto-transformers until the voltmeter 49 indicates the desired voltage for each coil. Although, as a general rule, a conversion graph of the type shown in Fig. 5 may be conveniently employed to adjust the energization of the motor coils, it will be understood that the voltmeter 49 may be calibrated in terms of motor torque output wherever desirable or expedient.

When one set of contacts of the switch 42 is closed, the motor will be energized in a first direction and will rotate the input gear 50 of the gear train until all backlash, deflection, etc., in the train is taken up and the motor is stalled. At this time the indicator ring 28 may be rotated until the reference pointer 33 thereof registers opposite a selected point on the calibrated disc 27. The switch 42 is than operated to close the second set of contacts, reversing the direction of motor energization, without altering the magnitude of the energization. Accordingly, the motor reverses and applies an equal torque in the opposite direction, rotating the input gear 50 of the gear train until all backlash, deflection, etc. have been taken up in the opposite direction and the motor is again stalled. By reference to the pointer 33 and calibrated disc 27, the total rotation of the rotor and shaft assembly from one stalled position to the other can readily be determined. This angular displacement provides the desired indication of gear train accuracy.

The angular displacement of the rotor and shaft assembly, in moving from one stalled position to the other, affords a highly accurate means of measuring the various inaccuracies in a precision gear train, since the rotor and shaft assembly is accurately balanced, and the torque applied to the gear train is entirely the result of the electrical energization of the motor 10. Accordingly, it is possible accurately to test small precision gear trains having a high reduction ratio (as much as 1000:1, for example) wherein relatively minute input torque is required and very small errors in torque application may result in relatively great errors in the test results.

In normal production testing it may be sufficient to energize the motor 10 in reverse directions at a rated torque value, in order to determine whether the angular displacement of the rotor and shaft assembly falls within predetermined specifications. However, as will be understood, it is possible with the described apparatus to perform additional functional analyses by noting the angular displacement of the gear train input at various torque values. Among the desirable tests which may be carried out with convenience with the new apparatus is that of determining the break-away torque, or the torque required to set the gear train in motion. This is accomplished by gradually increasing the energization of the motor coils 35, 36 until rotation of the rotor and shaft assembly is initiated. Reference to the voltmeter 49 and conversion graph will then indicate with substantial accuracy the break-away torque.

As shown in Fig. 2, a small high-ratio precision gear train may include a safety slip clutch 54 connected in series between the input and output of the gear train. The clutch 54 is desirably arranged to slip when excessive torque is applied to the gear train, to avoid damaging the delicate parts thereof. The new apparatus may be advantageously employed in connection with the initial adjustment of the slip clutch 54 since an accurately predetermined input torque may be applied to the gear train. Thus, with the output shaft 51 of the train being locked against rotation, the clutch 54 is adjusted, as by means of a threaded collar 55, to slip at less than rated torque. The motor 10 is then energized, using coil voltages sufficient to provide a predetermined rated torque. With the motor thus in operation the slip clutch 54 is adjusted until the motor 10 is stalled. When the clutch is adjusted in this manner the gear train will deliver its rated torque, and the clutch 54 will begin to slip under an applied torque slightly greater than the rated value.

In Fig. 4 there is shown a modified arrangement for measuring the angular displacement of the rotor and shaft assembly. In the modified apparatus, a perforated disc 56 is carried by rotor shaft 57 and is rotatable therewith. The disc 56 advantageously has 360 perforations arranged in a circle and spaced one degree apart. As the disc rotates, the perforations successively pass a light source 58, causing a beam of light to be impinged on a photo diode 59. Each time the light beam impinges on the diode 59 an electrical pulse is generated, and by means of suitable amplifiers, etc., the pulses are applied to binary counters 60—62. The counters 60—62 are arranged in decades, each comprising ten neon diodes, each diode advantageously being covered by a translucent plastic cap on which is imprinted a numeral, which becomes visible when the diode is lighted.

The testing of a precision gear train with the modified apparatus of Fig. 4 is conducted substantially in the manner previously described, except that the rotary excursion of the rotor and shaft assembly is registered by the cascaded counters 60—62, as the perforations in the disc 56 successively pass the light souce 58. The modified apparatus of Fig. 4 may be used to advantage where the test observations are to be made at a point remote from the gear train tested. Thus, the gear train and torque motor may be placed in an environmental test chamber and subjected to various conditions of moisture and temperature, for example, while the test may be conducted and observed by an operator outside the chamber. The modified arrangement is also useful in determining break-away torque or in the testing or adjusting of slip clutches, since rotation of the torque motor is indicated on the counter panel by the igniting of the neon diodes in rapid succession.

The new apparatus provides for the accurate testing and analysis of small precision gear trains, and is particularly advantageous for use in connection with gear trains having very high reduction ratios, where relatively minute (fractional inch-ounce) input torque is required. Moreover, in accordance with the invention, the testing of small precision gear trains may be readily carried out on a production basis, by means of relatively unskilled operators, since accurate measurements and careful handling are not required.

An important feature of the invention resides in the fact that the testing and analysis of a gear train may be conducted and observed from a point remote thereof, so that, if the environmental testing is required, a small test chamber will suffice.

It should be understood, however, that the forms of the invention herein described are intended to be illustrative only, as certain changes may be made therein without departing from the clear teachings of the invention. Accordingly, reference should be made to the following appended claims in determining the full scope of the invention.

We claim:

1. Apparatus for determining deflection in a precision gear train, which comprises means for locking the output of the train against rotation, a substantially vibration-free rotary motor, means for drivingly connecting the rotor of the motor to the input of the train, means for controlling power to the motor to produce a torque of predetermined magnitude in a predetermined direction, said means including means for reversing the direction of the torque, and indicator means for determining the deflection of the train input produced upon the reversal of torque application by the motor.

2. The apparatus of claim 1, in which the motor is an electrical drag cup torque motor, said means for controlling power includes an adjustable electrical circuit for applying electrical energy of variable magnitude to said motor, and said means for reversing the direction of the torque comprises switch means associated with the electrical circuit for reversing the polarity of the electrical energy.

3. The apparatus of claim 1, in which indicator means are associated with the rotor for indicating the rotation thereof upon the application and reversal of torque.

4. The apparatus of claim 3, in which the indicator means comprises an indicator member attached to the rotor and rotatable therewith, and a normally fixed but adjustable member positioned adjacent the indicator member, at least one of the members having graduations thereon for indicating relative rotation between the members.

5. The apparatus of claim 3, in which the indicator means comprises a perforated disc carried by the rotor and rotatable therewith, a light source on one side of the disc, a light receiver on the opposite side of the disc adapted upon exposure to the light source to provide an electrical impulse, and electrical circuit means for receiving such impulses and providing an indication of the number thereof.

6. The apparatus of claim 5, in which the means for receiving impulses comprises binary counter means arranged in decade groups and including a plurality of neon diodes adapted to be ignited successively, said diodes providing a visual indication, when ignited, of the impulses received.

References Cited in the file of this patent

UNITED STATES PATENTS

| | | |
|---|---|---|
| 1,233,014 | Baker | July 10, 1925 |
| 1,557,956 | Zubaty | Oct. 20, 1925 |
| 2,142,253 | Nunan | Jan. 3, 1939 |
| 2,589,401 | Krahulic | Mar. 18, 1952 |
| 2,722,824 | Jensen | Nov. 8, 1955 |
| 2,741,437 | Haworth | Apr. 10, 1956 |
| 2,757,537 | Warren | Aug. 7, 1956 |

FOREIGN PATENTS

| | | |
|---|---|---|
| 720,697 | Great Britain | Dec. 22, 1954 |